May 16, 1961  C. J. WHITE  2,984,204
SAFE SPEED INDICATOR
Filed Dec. 24, 1958  2 Sheets-Sheet 1
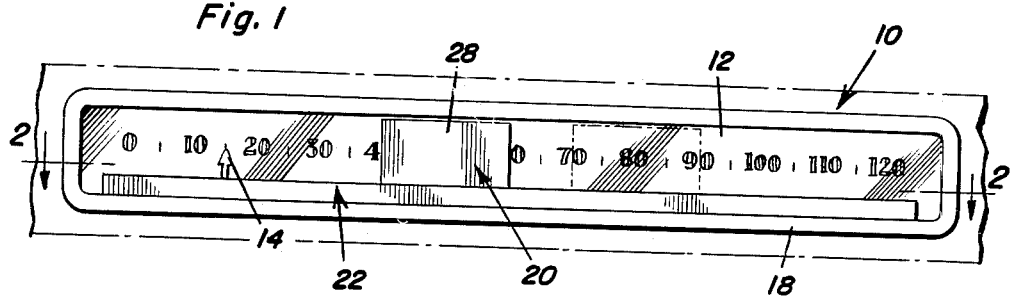
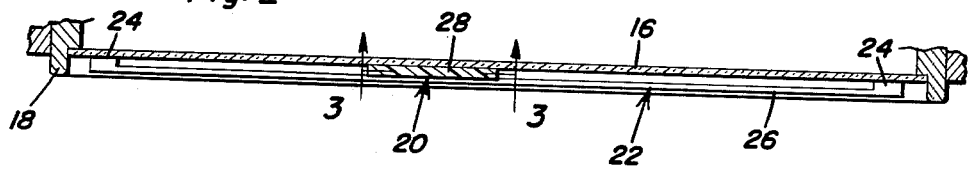
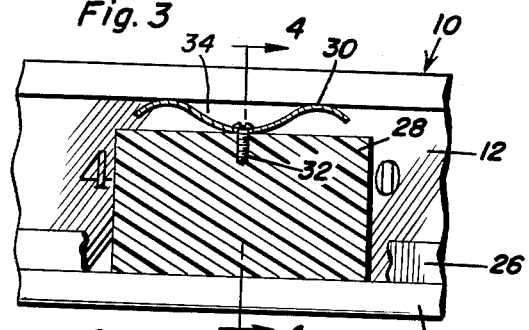
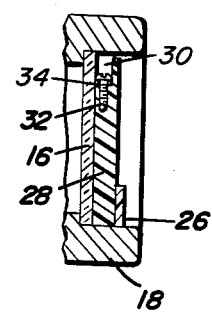
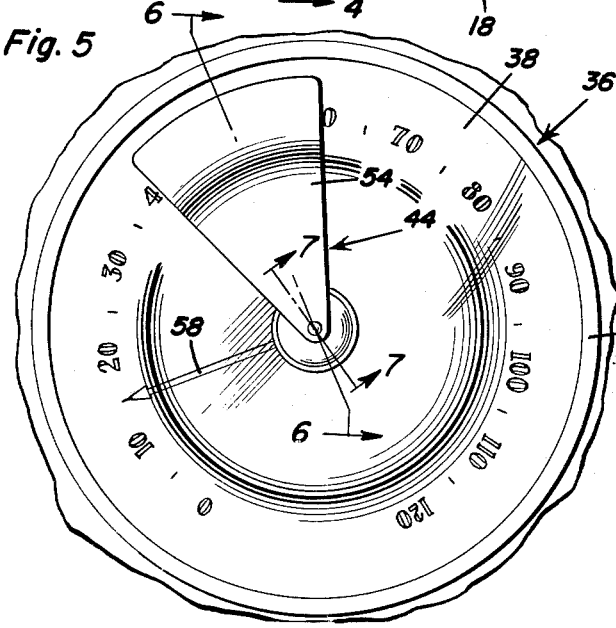
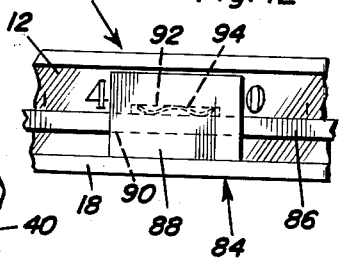
Charles J. White
INVENTOR.

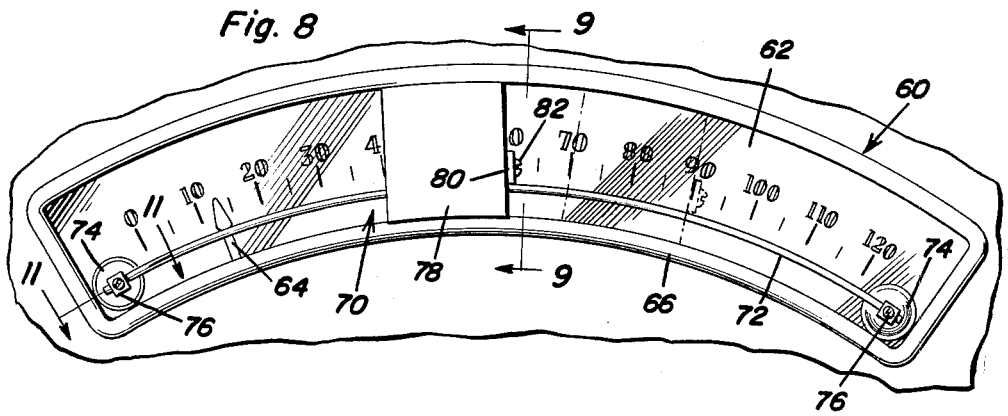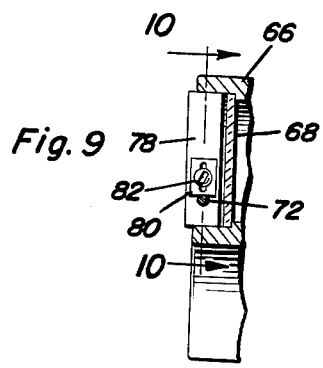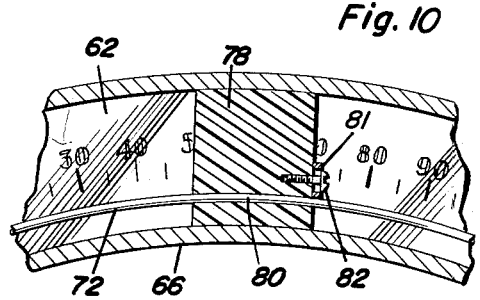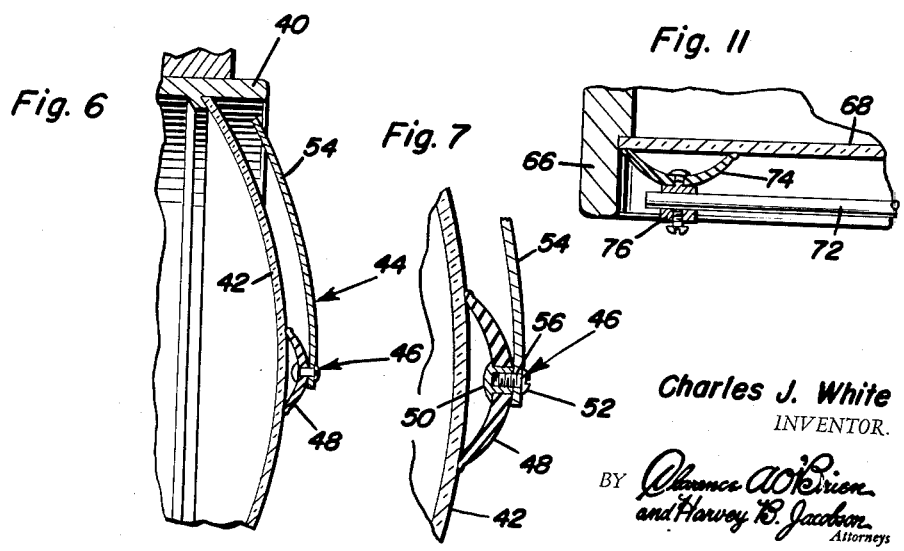

United States Patent Office 2,984,204
Patented May 16, 1961

2,984,204
SAFE SPEED INDICATOR
Charles J. White, 7906C Knollwood Road, Towson, Md.
Filed Dec. 24, 1958, Ser. No. 782,725
9 Claims. (Cl. 116—28)

This invention relates in general to new and useful improvements in vehicle accessories, and more specifically to a safe speed indicator for a vehicle.

It is the primary object of this invention to provide a safe speed indicator for a vehicle, which indicator is of the nature whereby the psychological reaction of an operator of a vehicle is depended upon by preventing the operator of the vehicle from determining the speed of the vehicle once it passes over the maximum speed desired.

Another object of this invention is to provide an attachment for a vehicle speedometer in the form of an opaque member, which member overlies the dial of the vehicle for a limited area and which may be set so that one edge thereof is disposed along the desired maximum speed indication on the dial and which will be of such a width whereby for a considerable period above the maximum speed limitation the pointer of the speedometer will be hidden thus preventing the operator of the vehicle from ascertaining the exact speed at which he is travelling.

Another object of this invention is to provide an attachment for vehicle speedometers which will block out a portion of the speedometer dial above the described speed, the attachment being of such a nature whereby it may be secured to the transparent face of the speedometer and positioned as is desired so that it may be adjusted depending upon the particular maximum speed of the area in which the vehicle is travelling.

Another object of this invention is to provide a general type of safe speed indicator which with limited modifications may be adapted to all types of speedometers, the safe speed indicator relying primarily upon an opaque member which overlies a portion of the speedometer dial immediately above the maximum speed desired and which is adjustably secured to the transparent face of the speedometer whereby it may be readily supported from the transparent face of the speedometer and overlie a limited portion of the dial immediately above the maximum speed desired, as indicated on the dial.

A further object of this invention is to provide a maximum speed indicator for the speedometer of vehicles, the maximum speed indicator being of an extremely simple construction and formed of readily obtainable inexpensive materials so that the manufacture of the safe speed indicator is economically feasible.

A still further object of this invention is to provide a safe speed indicator for vehicles, the safe speed indicator relying upon the psychological effect on a driver of the driver not being able to determine the speed of the vehicle, the safe speed indicator having means for blocking off a portion of the dial of the speedometer so that once the vehicle exceeds a maximum rate of speed set on the safe speed indicator, the pointer of the speedometer disappears from sight and for a limited speed range the operator of the vehicle is unable to determine the speed of the vehicle and thus has a tendency to reduce the speed of the vehicle to that which he can ascertain by viewing the speedometer and the position of the pointer thereof.

These together with other objects and advantages which will readily become apparent reside in the details of construction and operation as more fully hereinafter described and claimed, reference being had to the accompanying drawings forming a part hereof, wherein like numerals refer to like parts throughout, and in which:

Figure 1 is an elevational view of the straight line type of speedometer dial and shows associated therewith a first form of the invention.

Figure 2 is a horizonstal section view taken substantially upon the plane indicated by the section line 2—2 of Figure 1 and shows the relationship of the invention with respect to the transparent face of the speedometer;

Figure 3 is an enlarged fragmentary sectional view taken substantially upon the plane indicated by the section line 3—3 of Figure 2 and shows the manner in which the opaque member of the safe speed indicator is mounted for adjustable positioning with respect to the dial of the speedometer;

Figure 4 is a fragmentary sectional view taken substantially upon the plane indicated by the section line 4—4 of Figure 3 and shows further the details of the mounting of the opaque member;

Figure 5 is an elevational view of the circular type of speedometer and shows mounted thereon another modification of the invention;

Figure 6 is a fragmentary sectional view taken substantially upon the plane indicated by the section line 6—6 of Figure 5 and shows the manner in which the safe speed indicator is mounted on the transparent face of the speedometer;

Figure 7 is an enlarged fragmentary sectional view showing the specific manner in which the opaque member of the safe speed indicator is mounted;

Figure 8 is an elevational view of an arcuate type of speedometer dial and shows mounted on the transparent face of the speedometer another modification of the safe speed indicator;

Figure 9 is a fragmentary sectional view taken substantially upon the plane indicated by the section line 9—9 of Figure 8 and shows the manner in which the opaque member is mounted on the support therefor;

Figure 10 is a fragmentary sectional view taken substantially upon the plane indicated by the section line 10—10 of Figure 9 and shows further the manner in which the opaque member is retained in adjusted position on the support therefor;

Figure 11 is an enlarged fragmentary sectional view taken substantially upon the plane indicated by the section line 11—11 of Figure 8 and shows the manner in which the support for the opaque member is mounted on the transparent face of the speedometer; and Figure 12 is a fragmentary elevational view of another modification of the invention.

Referring now to the drawings in detail, it will be seen that there is illustrated the indicator head 10 of a speedometer wherein the dial thereof is of the straight line or slide rule type. The indicator head 10 includes a dial 12 which has associated therewith a pointer 14. Disposed in front of the dial 12 is a transparent face 16 which is mounted in a suitable frame 18. Carried by the transparent face 16 is a first form of safe speed indicator which is referred to in general by the reference numeral 20.

The safe speed indicator 20 includes an elongated support 22 which includes a pair of end blocks 24 which are connected together by an elongated bar 26. The support 22 is secured to the transparent face 16 of the speedometer by means of a suitable adhesive carried by the blocks 24. It is to be noted that the bar 26 is spaced from the transparent face 16 and is parallel thereto.

Seated on the lower part of the frame 18 intermediate the transparent face 16 of the bar 26 is an opaque member 28 which is in the form of a generally rectangular block. The opaque member 28 is slidable longitudinally along the frame 18 and may overlie that portion of the dial 12 desired. Secured to the upper part of the opaque member 28, as is best shown in Figure 3, is a spring clip 30 which urges the opaque member 28 downwardly into engagement with the frame 18. The spring clip 30 is secured to the opaque member 28 by means of a fastener 32 and is seated in a recess 34 formed in the upper rear part of the opaque member 28, as is best shown in Figure 4.

In the use of the invention, the opaque member 28 is slid along the head 10 of the speedometer until the left edge thereof coincides with the maximum speed desired for the vehicle. The opaque member 28 is of a width so as to cover from 15 to 20 miles of the reading of the dial 12. In the operation of the vehicle of which the speedometer head 10 is a part, the pointer 14 indicates the rate of speed of the vehicle by direct reading of the dial 12. When the pointer 14 approaches the opaque member 28, the operator of the vehicle is warned that he is approaching the maximum desired speed. On the other hand, once the vehicle exceeds the maximum desired speed, the pointer 14 disappears behind the opaque memmer 28 and the operator of the vehicle is unable to ascertain the speed of the vehicle unless he greatly exceeds the desired maximum speed of the vehicle and the pointer 14 appears to the right of the opaque member 28, as viewed in Figure 1. Inasmuch as the operator of the vehicle cannot determine the amount of overspeed, he has a tendency to release the accelerator pedal to the extent that the pointer 14 will return into view. This is the desired effect of the invention.

Referring now to Figures 5, 6 and 7 in particular, it will be seen that there is illustrated a head 36 of another type of speedometer wherein the dial 38 thereof is circular. Like the speedometer head 10, the speedometer 36 includes a frame 40 surrounding the dial, which frame 40 supports a transparent face 42 overlying the dial. It is to be noted that the transparent face 42 is of the bowed type. However, it may be flat as far as the purposes of this invention are concerned. Carried by the transparent face 42 is a second form of safe speed indicator which is referred to in general by the reference numeral 44.

The safe speed indicator 44 includes a support in the form of a support shaft 46 which is carried by a suction cup 48 which is in turn secured to the center of the transparent face 42. The support shaft 46 is formed of two pieces and includes a tubular nut member 50 and a bolt member 52.

Carried by the support shaft 46 is an opaque member 54 which has the general outlines of a sector and the pointed end of which has a bore 56 receiving the bolt 52. As is best illustrated in Figure 7, when the bolt 52 is tightened down, movement of the opaque member 54 is prevented. On the other hand, when the bolt 52 is loosened, the opaque member 54 may be rotated about the support shaft 46 to position it with respect to the dial 38.

In the use of the safe speed indicator 44, the opaque member 54 is positioned as described above with respect to the opaque member 28. Thus, when the pointer 58 of the speedometer head 36 reaches the prescribed maximum speed indicating point, an increase in the speed of the vehicle will result in the pointer 58 disappearing behind th opaque member 54 thus preventing the operator of the vehicle to visually ascertain the rate of speed at which the vehicle is travelling.

Referring now to Figures 8 through 11, inclusive, it will be seen that there is illustrated the head 60 of a speedometer wherein the dial thereof is arcuate. The dial of the speedometer head 10 is referred to by the reference numeral 62 and has associated therewith a pointer 64. The dial 62 is outlined by a frame 66 in which there is seated a transparent face 68. Carried by the transparent face 68 is another form of safe speed indicator which is referred to in general by the reference numeral 70.

The safe speed indicator 70 includes a support in the form of an elongated rod 72 which is arcuate in outline. The rod 72 is provided at the ends thereof with suction cups 74 which are secured to the rods 72 by means of fittings 75. This is best illustrated in Figure 11. Thus the rod 72 is mounted in spaced parallel relation with respect to the transparent face 68 of the speedometer head 60.

Slidably carried by the support rod 72 is an opaque member 78. The opaque member 78 has rounded upper and lower ends so as to correspond to the curvature of the frame 66 and is seated in the frame 66, as is best illustrated in Figures 9 and 10. The opaque member 78 has an arcuate bore 80 therethrough receiving the support rod 72. Thus the opaque member 78 is limited for sliding movement back and forth across the dial 62.

In order that the opaque member 78 may be retained in position on the support rod 72, there is provided a latch plate 81 which is adjustably secured to one end of the opaque member 78 by means of a fastener 82. Thus when the latch plate 81 is free of engagement with the support rod 72, the opaque member 78 may be moved to the desired overlying position with respect to the dial 62. Then by moving the latch plate 81 into engagement with the support rod 72, as is best shown in Figure 10, and tightening the fastener 82, the opaque member 78 is fixed in an adjusted position with respect to the dial 62. In this position the opaque member 78 is fixed against movement due to vibrations, etc., but may be manually shifted. Like the opaque members 28 and 54, the opaque member 78 will overlie a portion of the dial 62 so that once the vehicle of which the speedometer head 60 is a part exceeds the desired maximum speed, the pointer 64 indicating such speed on the dial 62 will move behind the opaque member 78 and thus out of view of the operator. This will result in the psychological effect mentioned above so as to cause the vehicle operator to slow the vehicle to the point where he can determine the speed at which the vehicle is travelling.

Referring now to Figure 12 in particular, it will be seen that there is illustrated the speedometer head 10 which has associated therewith a modified form of safe speed indicator which is referred to in general by the reference numeral 84. The safe speed indicator 84 includes a support bar 86 which may be identical to the support bar 26. However, the support bar 86 is disposed above the lower edge of the frame 18. The support bar 86 has mounted thereon an opaque member 88 with a transverse opening 90 therethrough, the transverse opening 90 receiving the support bar 86 so as to permit sliding movement only of the opaque member along the support bar 86. Also formed within the opaque member 88 is a recess 92 in which there is seated a spring clip 94 which bears against the support bar 86 and resists movement of the opaque member 88 along the support bar 86. The opaque member 88 overlies the dial 12 and functions in the same manner as the opaque member 28.

From the foregoing, it will be apparent that the safe speed indicator, which is the subject of this invention, relies upon the principal that if an operator of a vehicle cannot determine the exact speed at which the vehicle is travelling, the operator of such vehicle has a tendency to reduce the rate of speed of the vehicle. Thus by blocking off a portion of the dial of a speedometer immediately above the reading for the desired maximum speed of the vehicle, once the vehicle exceeds the desired maximum rate of speed, the pointer of the speedometer would disappear from view so that the operator of the vehicle will be unable to determine the rate of speed at which the vehicle is travelling. Thus the operator of the vehicle will have a tendency to slow the vehicle down to approximately the maximum rate of speed desired. It will also be apparent that the safe speed indicators are of extremely simple construction and may be manufactured at relatively low cost. In addition to this, it will be seen that by varying the construction of the maximum speed indicator, it may be adapted to all types of speedometer heads.

Hereinabove in each instance the speedometer to which the various forms of the invention may be attached has been specifically described as being of the type having a dial and a pointer. There are, however, models of speedometers which do not utilize a pointer as such, but have a disc which at the rest position of the vehicle covers the entire dial. As the speed of the vehicle increases, the disc swings to uncover the dial and thus indicate the speed of the vehicle. In another type of speedometer, the disc is disposed behind the dial and appears as a band in conjunction with the dial to indicate the speed. It is to be understood that the various forms of this invention may be used in conjunction with these general types of speedometers and others which may operate on the same general principle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safe speed indicator for use with vehicle speedometers of the type having a dial, a pointer, a transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer pointer above a predetermined speed reading on the speedometer dial, said support being in the form of a guide bar disposed in parallel relation to the speedometer face adjacent the speedometer face, said opaque member being positioned within the speedometer frame intermediate said guide bar and the speedometer face.

2. A safe speed indicator for use with vehicle speedometers of the type having a dial, a pointer, a transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer pointer above a predetermined speed reading on the speedometer dial, said support being in the form of a guide bar disposed in parallel relation to the speedometer face adjacent the speedometer face, said opaque member being positioned within the speedometer frame intermediate said guide bar and the speedometer face, and a spacing member carried by said opaque member and engaging the speedometer frame to retain said opaque member in an adjusted position.

3. A safe speed indicator for use with vehicle speedometers of the type having a speedometer dial, a speedometer pointer, a speedometer transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer pointer above a predetermined speed reading on the speedometer dial, said support being in the form of a guide bar disposed in parallel relation to the speedometer face adjacent the speedometer face, said opaque member defining a transverse opening therein, said guide bar passing through said opaque member.

4. A safe speed indicator for use with vehicle speedometers of the type having a speedometer dial, a speedometer pointer, a speedometer transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer dial, said support being in the form of a guide bar disposed in parallel relation to the speedometer face adjacent the speedometer face, said opaque member defining a transverse opening therein, said guide bar passing through said opaque member, and means carried by said opaque member engaging said guide bar and retaining said opaque member in an adjusted position.

5. A safe speed indicator for use with vehicle speedometers of the type having a speedometer dial, a speedometer pointer, a speedometer transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer dial, said support being in the form of a guide bar disposed in parallel relation to the speedometer face adjacent the speedometer face, said opaque member defining a transverse opening therein, said guide bar passing through said opaque member, and means carried by said opaque member engaging said guide bar and retaining said opaque member in an adjusted position, said last mentioned means being in the form of a spring retainer.

6. A safe speed indicator for use with vehicle speedometers of the type having a speedometer dial, a speedometer pointer, a speedometer transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer dial, said support being in the form of a guide bar disposed in parallel relation to the speedometer face adjacent the speedometer face, said opaque member defining a transverse opening therein, said guide bar passing through said opaque member, and means carried by said opaque member engaging said guide bar and retaining said opaque member in an adjusted position, said last mentioned means being in the form of a latch plate, a fastener carried by said opaque member retaining said latch plate in engagement with said guide bar.

7. A safe speed indicator for use with vehicle speedometers of the type having a speedometer dial, a speedometer pointer, a speedometer transparent face over said dial and a frame for said face, said safe speed indicator including a support, means attached to said support for mounting said support on the speedometer face, and an opaque member adjustably carried by said support for overlying a portion of the speedometer dial for obscuring the position of the speedometer pointer above a predetermined speed reading on the speedometer dial, said support being in the form of a pivot shaft, said opaque member being in the shape of a sector and having a pointed end portion journaled on said pivot shaft.

8. A safe speed indicator for use with vehicle speedometers of the type having a speedometer dial, a speedometer pointer, a speedometer transparent face over said dial and a frame for said face, said safety speed indicator including a support, means attached to said support for mounting said support on the speedometer face, and an opaque member adjustably carried by said support for overlying a portion of the speedometer dial for obscuring the position of the speedometer pointer above a predetermined speed reading on the speedometer dial, said support being in the form of a pivot shaft, said opaque member being in the shape of a sector and having a pointed end portion journaled on said pivot shaft, said pivot shaft being formed in sections with said opaque member clamped between said sections to retain said opaque member in an adjusted position.

9. A safe speed indicator for use with vehicle speedometers of the type including a dial having indicia thereon, a movable pointer associated with said dial indicating vehicular speed, a transparent face overlying said dial and said pointer, said safe speed indicator including a support, mounting means attached to said support mounting said support on the transparent face, opaque means adjustably carried by said support overlying a selective portion of the indicia on the speedometer dial obscuring the position of the speedometer pointer when said pointer overlies any part of said selective portion, said opaque means being significantly larger than said movable pointer and overlying a significantly larger portion of said speedometer dial.

References Cited in the file of this patent

UNITED STATES PATENTS 2,711,153     Wendt _____ June 21, 1955

FOREIGN PATENTS 744,690     France _____ Jan. 26, 1933